May 15, 1934.   D. B. BULLARD   1,958,844
DRILLING ATTACHMENT
Filed Aug. 11, 1932   3 Sheets-Sheet 2
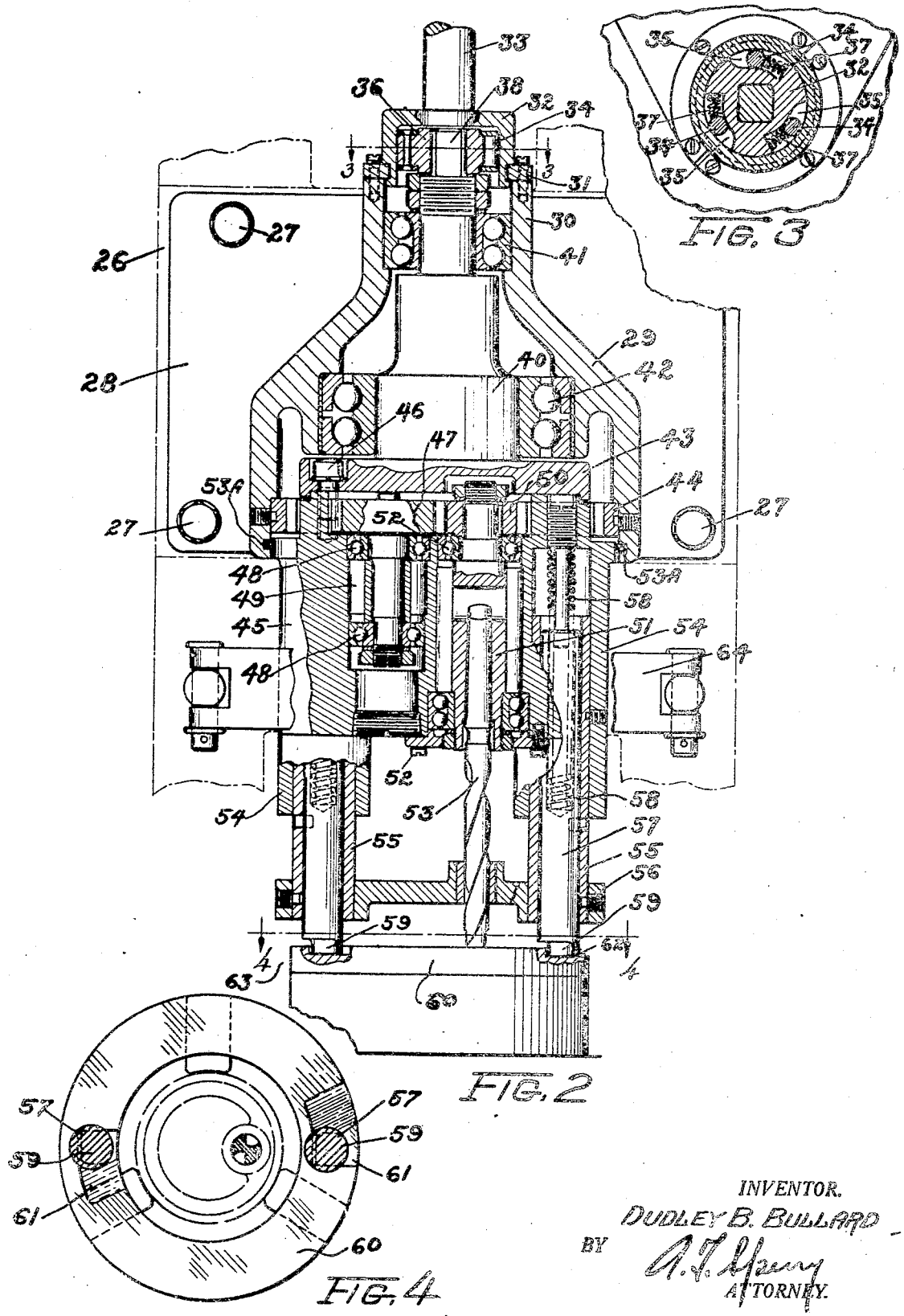
INVENTOR.
DUDLEY B. BULLARD
BY
ATTORNEY.

Patented May 15, 1934

1,958,844

UNITED STATES PATENT OFFICE 1,958,844

DRILLING ATTACHMENT

Dudley B. Bullard, Southport, Conn., assignor to The Bullard Company, a corporation of Connecticut Application August 11, 1932, Serial No. 628,313

9 Claims. (Cl. 29—38)

It is among the objects of the present invention to provide a machine tool drill head of simple and efficient construction which is designed to be particularly efficient in operation.

One of the more specific objects is to provide a drill head particularly designed for high speed operation and arranged to be operated with the avoidance of excessive starting torques and starting or driving shocks.

Another object is to provide a drill head having a plurality of positively acting driving connections so that the high speed drive therefor may be arrived at through an initial low speed drive.

Another object is to provide a drill head with means for operating the drills thereof by and with the rotation of the work and in addition thereto to provide an insurance of proper registration of drill and work.

Other objects and more particularly those relating to structural features such as the combination and inter-relation of parts will be apparent from a consideration of the drawings, especially when made together with a study of the following specification.

While the present invention is broadly applicable to various types of machine tools, the present embodiment of the inventive concept is particularly designed for use in connection with station type machine tools such as those known as the Mult-Au-Matic, the structure of which is set forth in the Bullard Patent No. 1,360,175, which patent relates to a turning machine, it being understood that one or more of the work stations may be provided with a drill head so that the machine may be used for a wide variety of operations.

That form of the invention herein specifically illustrated includes a rotatable body having a slow speed driving connection through an overrunning clutch and in addition thereto, it is provided with means to rotate the body at high speed with the work. Through suitable gearing, rotation of the body will rotate the drill spindles on their own axes.

Another feature of the invention is the provision of particularly designed engaging means which is arranged so that the engagement of the rotatable body is prevented except upon predetermined registration of drill and work.

Other important features and structural combinations which lend themselves to the provision of a highly efficient unit will become apparent hereinafter.

In the drawings:

Fig. 2 is a vertical section through a single spindle drill head formed in accordance with the present invention.

Fig. 3 is a section taken on the line 3—3 of Fig. 2.

Fig. 4 is a section taken on the line 4—4 of Fig. 2, and

Figure 1:
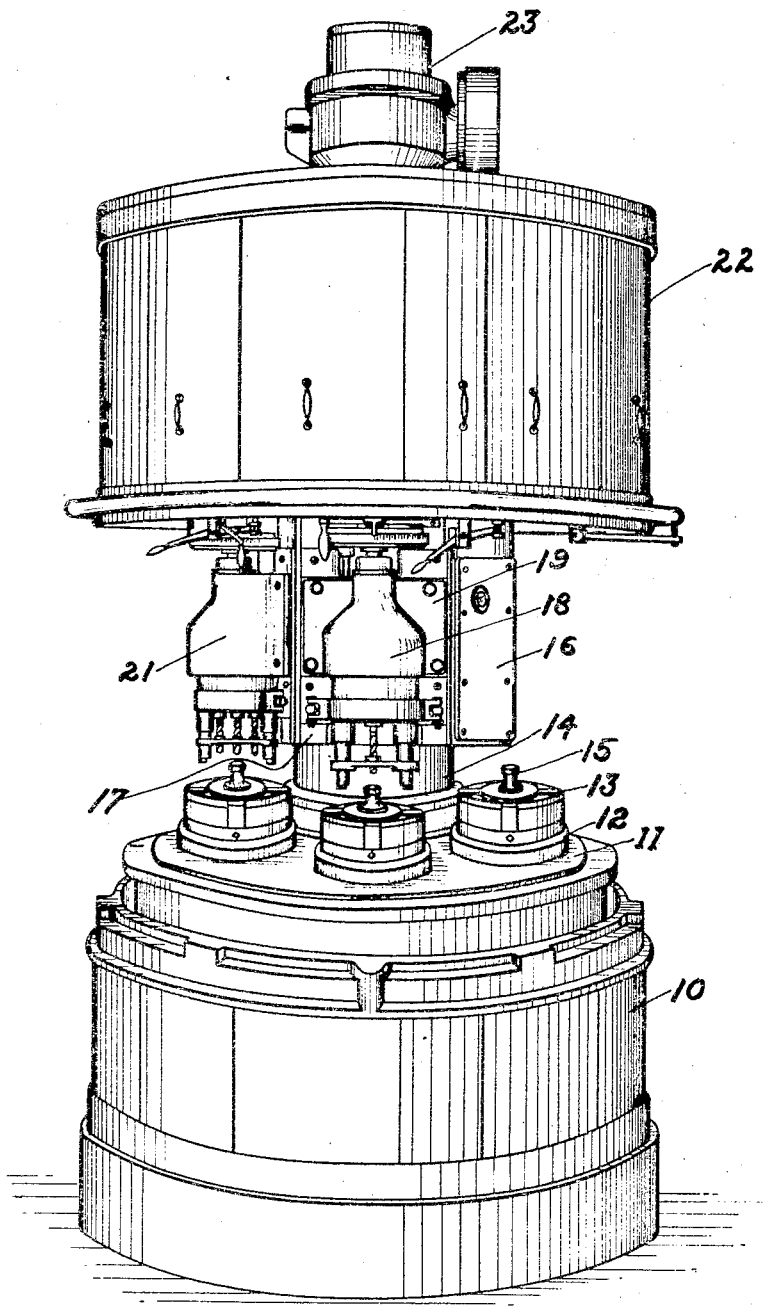
Fig. 1 is a side elevation of the Mult-Au-Matic type of machine equipped with drill heads formed in accordance with the present invention.

By reference to Fig. 1, it will be seen that one form of the present invention is particularly designed for use on vertical station type multiple spindle machines of the Mult-Au-Matic type hereinbefore referred to. By reference to the patent hereinbefore mentioned, the internal operating structure of the machine will be clearly understood and it is not believed to be necessary to dwell upon such details which form no part of the present invention. It is sufficient, therefore, to say that the structure shown in Fig. 1 includes a base 10 which supports a step by step indexing carrier 11 in which are journaled rotatable spindles 12 carrying chucks or work fixtures 13. From the base 10 a central column 14 rises which supports on its various faces the tools for operating upon the work 15. The face 16 of the column is left free of tools so as to provide a loading station at which new work may be placed in the chuck and finished work is removed.

While the arrangement of tools and the selection thereof are a matter of choice which is best determined by the character of the work, it will be seen that by way of illustration, the face 17 of the column is shown as being provided with a single spindle drill head 18. The drill head is mounted upon a slide 19 adapted to be vertically moved toward and away from the work. The feeding movement and the drive of the feed works for the drill head are not shown since various operating structures may be used for this purpose, a preferred feed works being disclosed in the patent above referred to. Upon an adjacent face of the column a multiple spindle drill head 21 is mounted which is adapted to be independently fed vertically toward and from the work. Mounted upon the column 14 and inclosed in a suitable housing 22 are the individual feed works for the heads, the driving motor for the machine being indicated at 23.

In the operation of the device, it will be understood that work pieces are loaded into the chuck or fixture 13 at the loading station 16 and the carrier 11 is indexed step by step to bring the work successively in line with the drill heads 18 and 21. The drills are first rotated by a drive shown in Figs. 2 and 5 and as the drill head is fed toward the work, fingers carried thereby engage the chuck or fixture to thus rotate the head with the rotation of the work.

It will be understood that in connection with a machine of this type, other instrumentalities may be used which in conjunction with the drill heads will turn out at each movement of the carrier a finished work piece. The invention is, therefore, not confined to machines of this type which are provided only with drilling tools nor is the drill head of the invention confined to use on machines of this type. It may, in some instances be effectively employed on single spindle machines or on machines having a plurality of spindles mounted in a continuously moving carrier wherein the work is rotated upon its own axis during its movement around the column.

With specific reference to Figs. 2, 3 and 4, it will be observed that the head is supported for vertical movement on the face of the column or other support by securement to a tool slide 26 as by bolts 27 which secure flange 28 of a non-rotatable casing 29. The upper end or neck 30 of the casing 29 carries an internally extending flange ring 31 which is received within a co-operating annular groove of a rotatable clutch housing 32. The latter is carried by and rotates with the initial low-speed positive driving shaft 33. The housing 32 constitutes part of an overrunning clutch which includes clutch rollers 34 received within tapering recesses 35 of a clutch hub 36, spring 37 being provided to urge the rollers towards the shallow ends of the recesses so that counter clockwise rotation of the hub (Fig. 3) is possible at a speed greater than that of the housing 32. Thus, if the hub is caused to rotate at a greater speed than that of the housing, the rollers will roll against the tension of the spring to the larger end of the recesses and thereby disengage the housing and thus permit a rotation of the hub at a higher speed than that of the shaft 33. The hub 36 is mounted upon and for rotation with a central body 40, a suitable connection and mounting for the hub being illustrated in Fig. 3 as by a squared end of the body 40 extending through a correspondingly shaped aperture in the hub. Suitable bearings 41 and 42 are arranged to retain alignment of and prevent friction between the body 40 and the non-rotatable casing 29. The lower end of the body 40 extends outwardly and is enlarged to provide a securing and supporting portion 43 for its companion portion 45 which carries the drill spindle and which is bolted thereto for rotation therewith by bolts 46. The internal surface of the lower skirt of the casing 29 is provided with an internal annular gear 44 which meshes with and drives a pinion 47 mounted within the recessed top of the body portion 45 upon a shaft 48 which is suitably journaled within a socket 49 of the portion 45. The pinion 47 also meshes with a drill spindle drive pinion 50 which is mounted upon a rotatable drill socket 51, the bearings 52 of which provide for its alignment and frictionless rotation within the body 45. The drill 53 is suitably secured within the socket 51 as by any conventional means. The lower skirt of the casing 29 also carries a packing ring 53ª which provides a lubricating seal between the non-rotatable casing and the rotatable body.

For rotating the body at a speed higher than that at which it is driven through the overrunning clutch and by the shaft 33, chuck or fixture gripping fingers 57 are provided which are seated within elongated tubular sections 54 of the body portion 45. Jig plate arms 55 of tubular formation are secured within the members 54 and support the jig plate 56 therebetween. Within the members 55, the fingers 57 are mounted and are urged outwardly by the spring 58.

With particular reference to Fig. 4, it will be noted that the lower end of the fingers 57 are, as indicated by the dotted line, provided with squared ends 59. For cooperation therewith, the chuck or fixture plates 60 are provided with inclined slots or recesses 61. It will be noted that the recesses 61 of the chuck or fixture face plate, while being alike in configuration and the contour of their bottom surface, are unlike in that the one to the left of the figure extends to the inner edge of the fixture ring which is open, while the one to the right has a band between the inner circumference of the fixture ring and the inner wall of the recess and extends outwardly to the outer edge of the ring which side is open. Thus, they each move in individual paths with the rotation of the work spindle. It will also be noted that a cooperating distinction is found in the end of the fingers, the one to the right having an extension formed on its outer surface which extension forms a continuation of the outer surface, while the inner surface is cut away, and whereby it can register only with the path of the right hand recess, while that on the left has the outer surface cut away and extends across to form a continuation of the inner surface of the finger. Thus, the finger ends and the recesses form pairs off center with respect to the axis of rotation of the work spindle. By reference to the figures, it will be noted that the finger shown to the right in Fig. 4 cannot possibly engage with the recess shown to the left in Fig. 4 and vice versa. Thus, it will be noted that the spindle head can be driven from the fixture plate only when the fixture plate and spindle head are in a predetermined aligned relationship.

It will, of course, be obvious that in the operation of the device, the tool head moves downwardly and while so moving, the shaft 33 is revolved and, through the overrunning clutch, picks up the internal body and rotates it about its own axis, which rotation, through the engagement of the pinion 47 with the fixed annular pinion 44 of the non-rotatable casing, will rotate the drill spindle on its own axis. As the head moves downwardly, however, the fingers are moved against the face plate and are free to move further since the fingers will move up within their sockets against the tension of their forcing spring.

From the discussion of the cooperating structure of the finger ends and the face plate recesses, will be observed that the chuck or fixture will be free to continue its rotation during the contact of the fingers and without driving the head until such time as the proper finger is in alignment with the proper recess, or, in other words, until the head and chuck assume the respective locations indicated in Fig. 4. Should the fingers strike the face plate out of the alignment as shown in Fig. 4, they will not be picked up by the face plate and the right hand finger of Fig. 4 will pass over the left recess of Fig. 4 without engaging therewith.

Figure 5:
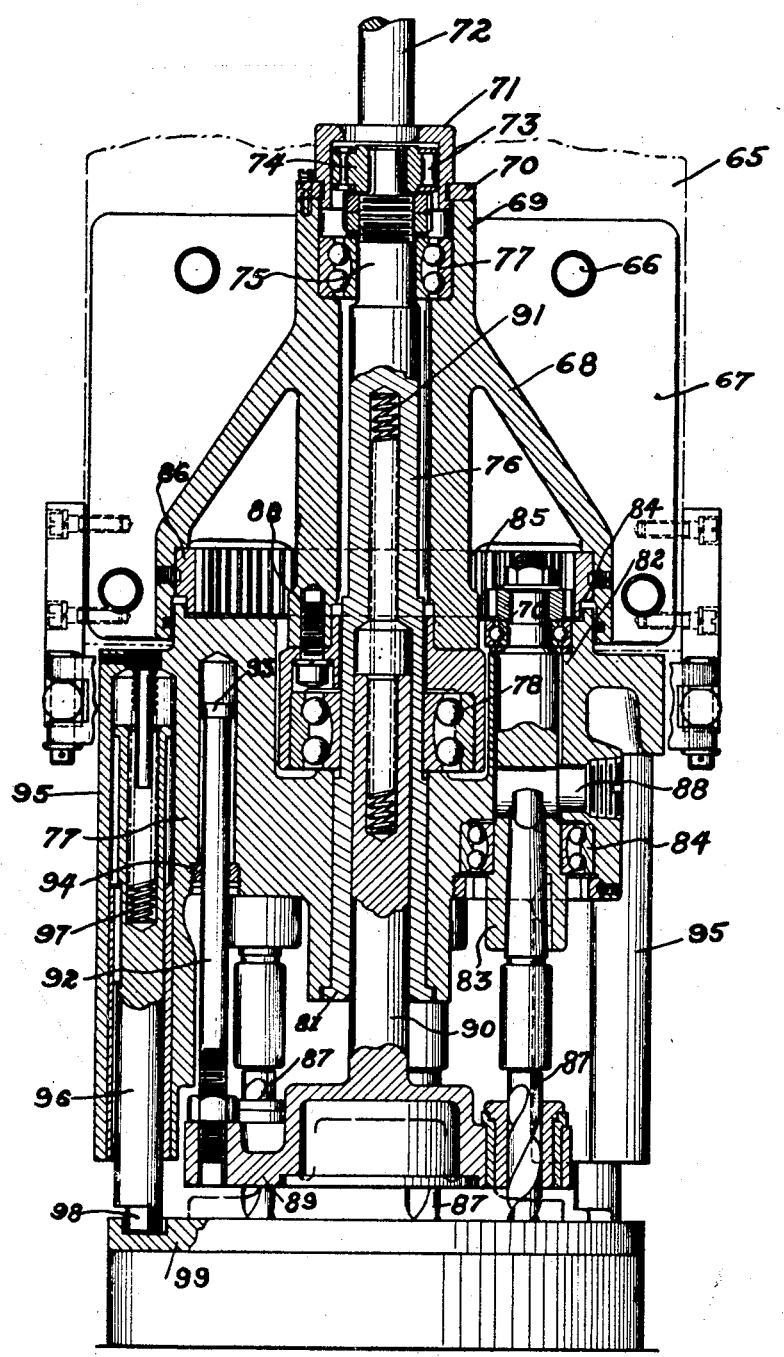
Fig. 5 is a vertical section through a multiple spindle drill head formed in accordance with the present invention.

To avoid the danger of continued rotation of the head after the head is withdrawn from the face plate and to retard its extra rotation, a simple band brake as illustrated at 64 in Figs. 2 and 5 and also as shown completely in Fig. 1 may be employed.

By reference to that structure illustrated in Fig. 5, it will be seen that the inventive concept is not restricted to a single spindle drill head nor to the precise structure illustrated in Fig. 2. While the drill head shown in Fig. 5 is in many ways substantially like that shown in Fig. 2, it differs in certain respects as for instance, in the provision of a structure having not one but a plurality of drill spindles which may be evenly distributed about the axis of the rotating body or which may be unevenly distributed.

The upper end of the shaft 76 is provided with a bearing 77 between the shaft and the casing while a second aligning bearing 78 is provided mounted in a bearing box 79, secured as bolts 80 from the stationary casing 68. The rotatable body 77 is mounted on the shaft 76 for rotation therewith, the shaft terminating in a flange 81 which forms a shoulder for the reception of the body. The body has a plurality of vertical bores 82 within which the drill spindles 83 are mounted, bearing 84 being provided for properly aligning the drill spindles. Each spindle is provided at its upper end with a driving gear 85 which meshes continuously with an internal toothed gear 86 carried by the lower end of the body 68. Thus, as the head is rotated, it will carry the drill spindles with it and at the same time, the spindles will be rotated on their own axis at a speed proportionate to the speed of revolution of the body.

Obviously, any type of tool such as a drill, reamer or counter-bore tool may be carried by the drill spindles, such tools being here illustrated and identified by the numeral 87. As distinct from that form of the invention shown in Fig. 2, it will be seen that this form of the invention is particularly designed as a multiple spindle drill head. The insertion and removal of tools is rendered easy by the provision of radial apertures 88 in the body which communicate with the conventional apertures in the drill spindle.

The drill head is designed to carry a jig plate 89 which is supported by a central rod 90 received within a central bore of the shaft 76, a spring 91 being provided to normally urge the jig plate downwardly. One or more side guide rods 92 may be provided for the jig plate, their upper ends extending into bores of the body and having heads 93 adapted to abut a threaded stop ring 94 so as to limit the outward movement of the jig.

As in the case of that form of the invention shown in Fig. 2, means are provided for driving the body from the chuck or fixture. Thus, the body is provided with tubular sections 95 which mount therein gripping fingers 96 which are normally urged outwardly by springs 97. The ends of the fingers 96 terminate in squared ends 98 which are the counter-part of the ends 59 of the fingers 57. The face of the chuck or fixture 99 is indicated as having the characteristic recesses as indicated at 61 in Fig. 4. Thus, the automatic driving of the body by the work holders will be accomplished and the insurance of predetermined registration of work and drills will be accomplished in the manner hereinbefore set forth.

Since the operation of this form of the invention is in substance precisely that as described in connection with Fig. 2, it is not believed that this specification need be encumbered by a repetitious outline of such operation.

From the foregoing, it will be seen that the present invention provides a compact, efficient and accurate means for drilling, reaming or other like operations. It will be understood that the invention has been illustrated in only some of its many structural embodiments and that numerous changes, modifications and the full use of equivalents may be resorted to without departing from the spirit or scope of the appended claims.

I claim:

1. A machine of the class described including the combination of a horizontal bed, means for rotating it about a central axis, work stations arranged about said axis above said bed, a drill head located at one of the work stations, rotating work holders mounted in the bed for rotation on their own axis on the work station, and means for rotating the drill by rotation of the work holders, and means for initially operating the drill independent of the work holders, said means for operating the drill from the work holder being operative only upon predetermined relation of the work with the drill.

2. In a drill head the combination of a driving shaft, means connecting the driving shaft with the drill for rotating the same, and independent means for rotating the drill as an incident to the rotation of work upon which the drill is to act, said last mentioned means being adapted to operate only when the drill and work have assumed a predetermined definite relationship.

3. In a drill head, a rotatable body, a drill, means to cause rotation of the drill by rotation of the body, means on said body to engage a work holder whereby the body will be revolved therewith, and means to rotate said body independent of said last mentioned means.

4. In a drill head, a rotatable body, a drill, means to cause rotation of the drill by rotation of the body, means on said body to engage a work holder whereby the body will be revolved therewith, and means to rotate said body independent of the said last mentioned means, said means including an overrunning clutch whereby the body may be moved at a slower speed than that which may be imparted thereto by the work holder.

5. In a drill head, a rotatable body, a drill spindle mounted therein and rotatable on its own axis, and a pair of independent means for rotating said body, and means for rotating said spindle on its own axis by rotation of said body.

6. In a drill head, a non-rotatable vertically moving casing, a rotatable body mounted by said casing, a drill spindle mounted within said body and rotatable on its own axis by rotation of said body and a pair of independent positive driving means for said body.

7. In a drill head, a non-rotatable vertically moving casing, a rotatable body mounted by said casing, a drill spindle mounted within said body and rotatable on its own axis by rotation of said body and a pair of independent positive driving means for said body, one of said means including an overrunning clutch.

8. In a drill head, a non-rotatable vertically moving casing, a rotatable body mounted by said casing, a drill spindle mounted within said body and rotatable on its own axis by rotation of said body and a pair of independent positive driving means for said body, one of said means being adapted to establish driving connection through the vertical movement of said casing.

9. In a drill head, a non-rotatable casing, a rotatable body mounted by said casing, a plurality of drill spindles mounted by said body and rotatable upon their own axis, driving connections between said spindles and said casing whereby movement of said spindles with said body will rotate said spindles on their own axes and two independent positive driving means for said body.

DUDLEY B. BULLARD.